United States Patent [19]

Giles et al.

[11] Patent Number: 4,881,803

[45] Date of Patent: Nov. 21, 1989

[54] ORNAMENTAL SUNGLASSES RETAINER

[76] Inventors: Conley W. Giles, 603 W. 13th, No. 292, Austin, Tex. 78701; Karen L. Teare, P.O. Box 1-A-157, 603 W. 13th, Austin, Tex. 78701; R. Peyton Wimmer, 1930 West Rundberg, Austin, Tex. 78758

[21] Appl. No.: 184,892

[22] Filed: Apr. 22, 1988

Related U.S. Application Data

[63] Continuation-in-part of Ser. No. 874,137, Jun. 13, 1986, abandoned.

[51] Int. Cl.⁴ .................................................. G02C 3/02
[52] U.S. Cl. .................................... 351/156; 351/157
[58] Field of Search ......................... 351/123, 156, 157; 24/3 C; 403/390

[56] References Cited

U.S. PATENT DOCUMENTS

| | | | |
|---|---|---|---|
| 2,660,092 | 11/1953 | Bloom | 351/157 X |
| 4,541,696 | 9/1985 | Winger | 351/156 X |
| 4,696,556 | 9/1987 | Perry | 351/157 |

Primary Examiner—Rodney B. Bovernick
Attorney, Agent, or Firm—Joseph F. Long

[57] ABSTRACT

An ornamental sunglasses retainer comprising tubular stretchable material with the ends that fit over the sunglasses temple pieces treated with a stretch reducing prepolymer and threaded through either side of a manually releaseable friction catch and then pushed over the temple pieces of a pair of sunglasses into the hinges; there being sufficient length in some embodiments that by using the releasable friction catch the glasses may be held in any desired position from dangling around the wearer's neck to snugly against the wearer's head. Other embodiments include a flexible sun visor of foamed material attached to the tubular stretchable material of the retainer to added ornamental and utility.

9 Claims, 3 Drawing Sheets

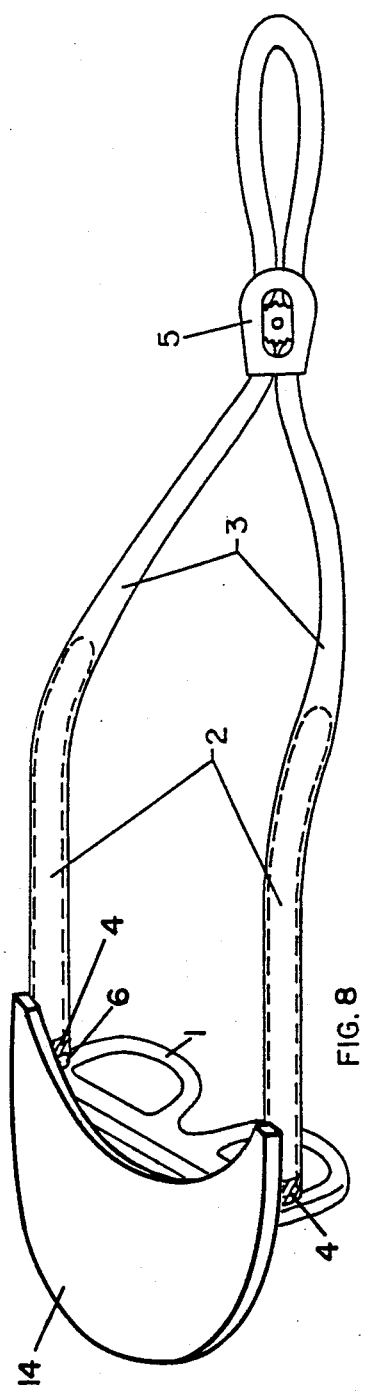
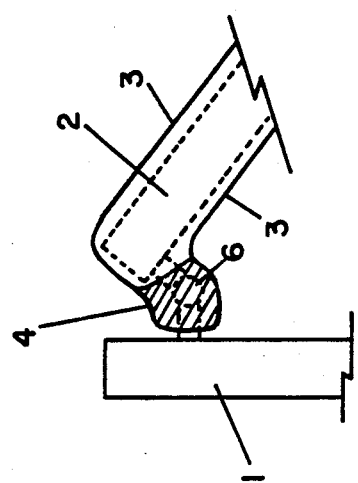

ORNAMENTAL SUNGLASSES RETAINER

BACKGROUND OF THE INVENTION

This is a continuation-in-part of Ser. No. 06/874,137 filed 6/13/86 now abandoned, entitled "An Ornamental Sunglasses Retainer."

This invention pertains to an ornamental sunglasses retainer that is suitable for either sunglasses with extra large temple pieces or normal size temple pieces. In some embodiments of the invention the retainer performs the function of holding the sunglasses in any position from snugly in place to loosely around the neck. In other embodiments the retainer simply minimizes slippage as occurs from perspiration of the wearer.

All embodiments are designed for low cost manufacture and to be ornamental as well as having utility in holding sunglasses in place.

There are many different sunglasses retainers on the market but we find none of a design to accomplish all the objectives of this invention which include:

1. being an easily adjustable retainer that will hold firmly to temple pieces of sunglasses
2. being of a low cost easily manufactured design
3. being of a type particularly suited to be ornamental such as a color and design to match a bathing suit or other attire.

One preferred embodiment is manufactured from a stretchable cloth known as Spandex by making a tube on a machine known as "Spaghetti" machine. The cloth fed into the tube making machine has a resilient prepolymer composition applied in a such a manner that the continuous tube may be cut in desired length and will have the dried resilient prepolymer composition within and around the threads on one or both ends of the fabric tube after it is cut to desired length. Alternatively, the ends of the continuous tube may be treated by dipping after cutting.

A commercial product called AQUASEAL which is a polytetramethylene ether glycol prepolymer is one of a suitable group of compositions that reduces stretchability of the fabric tube and restricts the end opening while at the same time sealing the threads and increasing the slideable friction resistance. This treated end layer may be stretched into the hinge of the glasses in some embodiments of the invention so that hinge action tightly clamps the end as it constricts over the hinge joint. Preferred treatment is to dip enough of the tube end that total treated portion constricts into the hinge. Dipping puts treating material both inside and outside the tube. This significantly increases the friction and resistance to slipping over the abrupt edge of the hinged joint. Other ways to increase the holding power of the stretchable material when slipped over the temple piece while still allowing removeability would come within the spirit and purpose of the invention.

Other embodiments used with sunglasses with very large temple pieces cover about half of the temple piece and a small stretchable band such as a rubber band is used over the narrow part of the temple piece to hold the covering in place.

In yet another embodiment a colored flexible sun visor made of a foamed material is attached by stapling or glueing on each side near the treated end of the two stretchable tubes that are slipped over the sunglasses temple pieces. This foamed visor adds ornamentation and also has utility in addition to acting as a sun shade in that it may be folded and tied to the glasses to protect the lens when glasses are not in use. Further, the foamed material in the sun visor is buoyant enough that glasses will float in water.

In one embodiment both ends of the tubular retainer material is slipped through a manually releaseable plastic friction catch (friction catch U.S. Pat. No. 3,564,670 is one of a suitable group) and either end of the tubular retainer material is then slipped over the temple pieces of a pair of glasses. This will give a loop—preferably up to a foot long behind the manually releaseable friction catch. This catch may be adjusted to hold the glasses tightly to the wearer's head or to allow the glasses to be held loosely around the wearer's neck. Other embodiments will be covered in the following more detailed descriptions.

We have considered the following patents in the general area:

| Pat. No.  | Inventor         |
|-----------|------------------|
| 4,070,103 | Meeker           |
| 3,526,450 | Berry            |
| 3,517,415 | McGrath and Otto |
| 4,133,604 | Fuller           |

The invention we have described is uniquely different in several aspects such as ease of manufacture, treated increased holding power ends, ease of adjustment, and material that will after treatment slide over and constrict into the hinge of the temple pieces but still allow the hinge to operate properly.

BRIEF SUMMARY OF THE INVENTION

The invention pertains to a stretchable covering for the temple pieces of glasses so designed as to be manufactured cheaply, to be easily removeable and reuseable, to be ornamental and in some embodiments to adjustably hold the sunglasses in most any position desired by the wearer and in another embodiment include a flexible sun visor of a foamed material. In a preferred embodiment Spandex or Lycra is used for the stretchable material. The tubular stretchable covering may be one piece with each end slipped through a manually releaseable friction catch and thence pushed over the temple pieces of the sunglasses. The length of material used is sufficient to allow adjustment to be made to hold the glasses loosely around the neck or tightly against the head. An important feature of the invention is treatment of the end of the material with a resilient prepolymer composition to seal the fibers to prevent fraying to stretchably restrict the end opening so as to allow the treated end to constrict into and be held in the hinge of the sunglasses and to increase the slideable coefficient of friction so that as the stretchable tube is pulled the holding power of the end will allow the pulling of the stretchable material to cause tightening of the material on the temple pieces. A commercial product such as Aquaseal which is primarily a polytetramethylene ether glycol prepolymer has been used quite effectively. Othe products with similar properties could be used.

A textile manufacturing unit to sew a small continuous tube which has been called a "spaghetti" machine has been used for manufacture. The Aquaseal material may be applied to the continuous tube so formed at proper intervals so that each end of a cut piece has been treated or so that only one end of a cut piece has been treated—depending upon adjustment of speed and the cutter. Alternatively, the end may be treated by dipping after cutting. In one preferred embodiment both ends of a piece of sufficient length to allow a loop behind the adjustable friction catch are treated by dipping and soaking so as to have the treated material on both interior and exterior of the tube. The length in this embodiment would be sufficient to allow the wearer to hold the glasses loosely around the neck.

In another embodiment only one end of each of two pieces is treated and the two pieces are individually slid through the adjustable friction catch with the treated end sliding over the temple pieces. In this embodiment the ends behind the friction catch would normally be fitted with an ornament such as a bead that would also serve the purpose of preventing accidental disassembly of the retainer by the wearer.

Both of the above embodiments may be used to slip completely over the temple pieces and over the first portion of the glasses hinge so that in use the hinge pinches the end to give increased holding power. Also both may be slipped partly over the temple pieces with a plastic band such as a rubber band used over the retainer at a narrow portion of the temple pieces in order to increase holding power of the stretchable tubular retainer. This embodiment would be used with sunglasses having extra large temple pieces.

In another embodiment a flexible sun visor is attached to the tubular ends that stretch over the temple pieces. This embodiment may be made with a continuous tube or two shorter tubes as outlined above.

Still other embodiments could be visualized and we do not mean to be limited to exact details but only as to spirit and general structure as outlined in these specifications and claims —for example short single pieces could be used on each temple piece without the adjustable friction catch. These short pieces would tend to hold glasses in place and prevent perspiration from causing the glasses to slide off the wearer's fact. In this case increase bulk of the stretchable material may be used. These could go part way or completely over the temple pieces. If only part way over the temple pieces a stretchable band such as a rubber band could be used to hold the retainer more firmly to the temple piece.

BRIEF DESCRIPTION OF THE DRAWINGS

FIG. 8 shows an embodiment similar to FIG. 1 but including a flexible sun visor made of a foamed material.

FIG. 9 shows a detail of fabric as it constricts into the hinge.

DETAILED DESCRIPTION OF THE DRAWINGS

Figure 1:
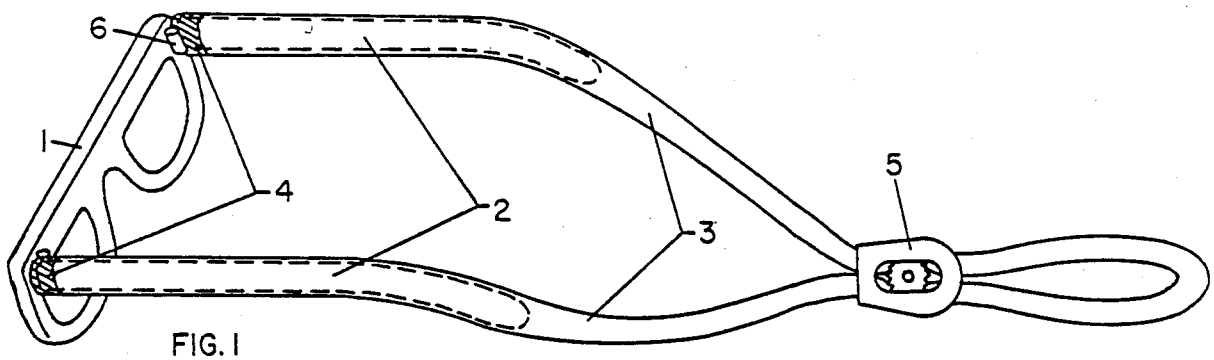
FIG. 1 shows one embodiment of the sunglasses retainer in place over the temple pieces or a pair of sunglasses with this embodiment having a loop behind the head of the wearer.

FIG. 1 shows one embodiment of the invention as it would be used over normal size temple pieces 2 of sunglasses 1. The stretchable tubular fabric 3 forms the body of the retainer with the resilient prepolymer treated end 4 giving increased holding power both by constriction of the fabric and by being held in the hinge 6. One type of an adjustable slideable friction clamp is shown in greater detail in FIG. 5.

Figure 2:
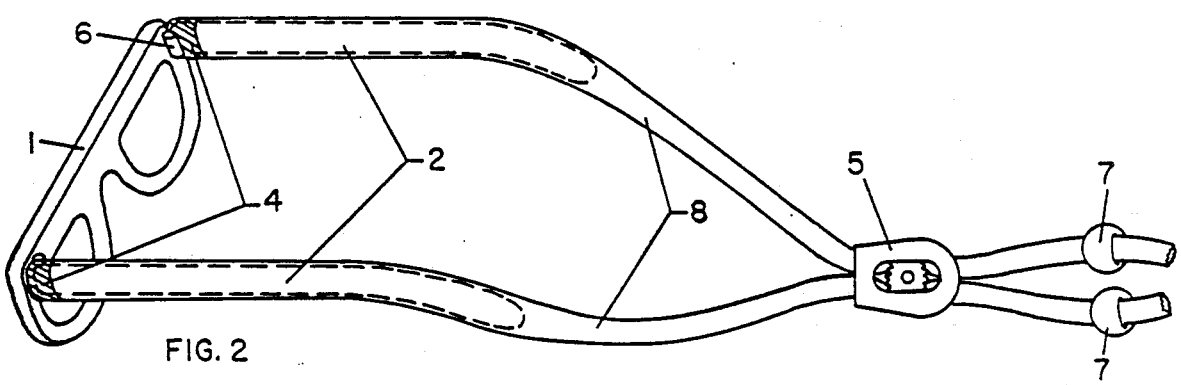
FIG. 2 shows a second embodiment in place over the temple pieces of a pair of sunglasses with this embodiment made from two sections of tubular fabric with an end terminating in an enlarged portion to prevent accidental disengagement of the friction catch.

FIG. 2 shows another embodiment of the invention as it would be used over normal size temple pieces 2. In this embodiment the stretchable fabric body 8 is two separate pieces of stretchable tubular fabric. Again the treated ends 4 give increased holding power. The fabric tubes are adjustably and slideably held together with a friction catch 5. The enlarged ends attached to a part of the fabric tubes 8 may be a knot, a treated knot or a plastic or metallic shape such as a bead.

Figure 3:
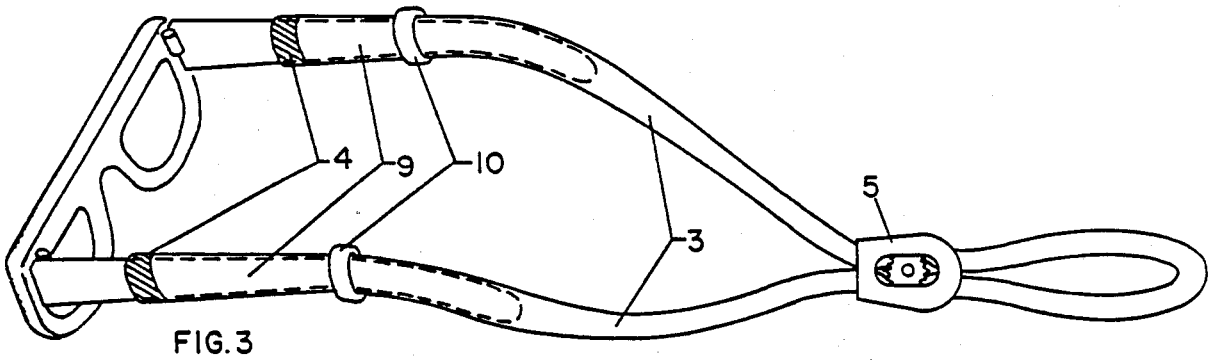
FIG. 3 shows still another embodiment suitable for glasses with extra large temple pieces. This embodiment being the same as in FIG. 1 but with an elastic ring 10 added to increase the holding power of the retainer.

FIG. 3 shows this invention installed on a pair of sunglasses with extra large temple pieces 9. This embodiment is similar to the embodiment of FIG. 1 with an added elastic ring 10 to increase holding power. Similarly to FIG. 1 we use a treated end 4, the body of the retainer 3 and an adjustable slideable catch 5.

Figure 4:
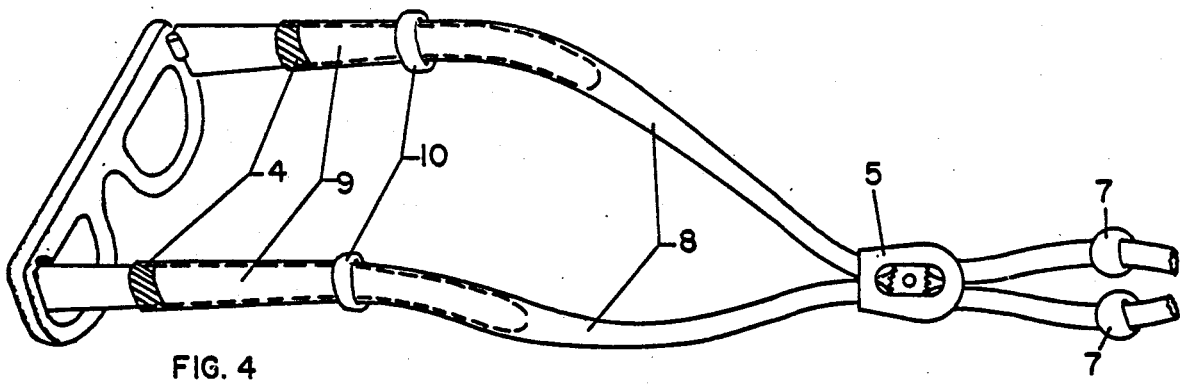
FIG. 4 shows still another embodiment suitable for glasses with extra large temple pieces; this embodiment being similar to FIG. 2 but with an elastic ring 10 added for increased holding power of the retainer.

FIG. 4 is still another embodiment designed to fit extra large temple pieces 9 of sunglasses. This embodiment is similar to FIG. 2 with an added elastic ring 10 to increase holding power. Again we have treated ends 4, two pieces of tubular fabric 8 and an enlargement 7 to prevent disengagement of the slideable adjustable catch 5.

Figure 5:
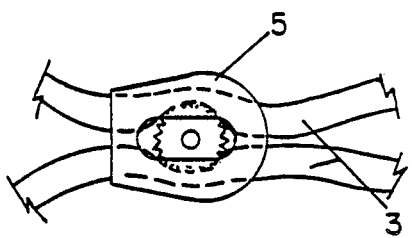
FIG. 5 shows one type of an adjustable friction catch.

FIG. 5 indicates the action of the slideable adjustable friction catch 5 with a portion of the tubular fabric 3, FIG. 1 or 8, FIG. 2 threaded into the friction catch.

Figure 6:
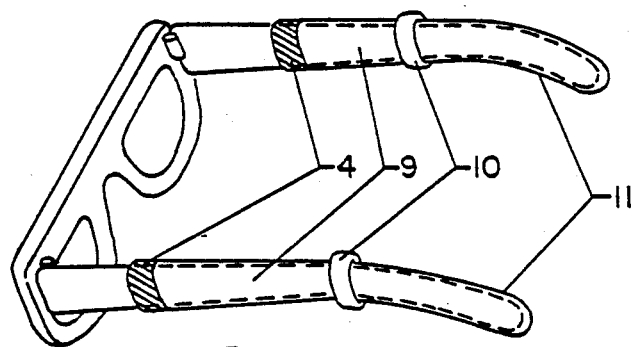
FIG. 6 shows yet still another embodiment suitable for glasses with extra large temple pieces with an elastic ring 10 added to increase frictional resistance to sliding.

FIG. 6 shows still another embodiment to be used over glasses with extra large temple pieces 9. In this embodiment the body of the tubular fabric retainer 11 is short enough to only cover the end of the temple pieces 9. Again a treated end 4 is used to increase holding power of the retainer along with an elastic ring 10 which is desirably made of a somewhat bulky resilient fabric.

Figure 7:
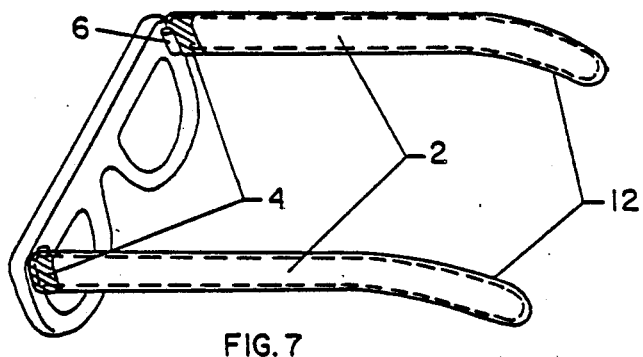
FIG. 7 shows another embodiment suitable for glasses with normal temple pieces.

FIG. 7 shows even yet another embodiment. In this case the body of the tubular fabric retainer 12 is sized to fit over normal sunglasses temple pieces 2 with treated ends extending into the hinges 6 to give sufficient holding power.

FIG. 8 shows an embodiment with a flexible sun visor 14 attached to the tubular fabric retainer 12 which is sized to fit over normal sunglasses temple pieces 2 with treated ends 4 extending into the hinges 6 to give sufficient holding power.

FIG. 9 shows a detail of treated end 4 of fabric 3 as it constricts into hinge 6 of the sunglasses frame 1.

Embodiments in FIG. 1, FIG. 2, FIG. 7, and FIG. 8 all use the extra holding power created by clamping of the fabric 3 in hinge 6 when temple piece 2 is in the in-use position against frame 1. Only the length of the end that will constrict into the hinge is treated. Preferred treatment is by dipping so as to have treating material on both inside and outside of the tube end.

We claim:

1. A sunglasses retainer comprising:
   A. a stretchable fabric tube to fit snugly over temple pieces of said sunglasses and to constrict into and be frictionally held by hinges of said temple pieces,
   B. a resilient treating material in the interstices of the fibers in that portion of each end of said stretchable fabric tube that will constrict into said hinges,
   C. a manually adjustable friction catch holding means to slideably engage said stretchable fabric tube when each of said ends is threaded through said holdings means said manually adjustable friction catch holding means comprising a manually adjustable circular corrugated member, moveable in a housing that narrows at one end, thereby frictionally holding said stretchable fabric tube increasingly tighter when said manually adjustable friction catch holding means is adjusted to a desired position and tension is applied to said stretchable fabric tube extending from said one end of said housing.

2. A sunglasses retainer as in claim 1 where said stretchable fabric tube is LYCRA.

3. A sunglasses retainer as in claim 1 where said stretchable fabric tube is a stretchable synthetic fiber.

4. A sunglasses retainer as in claim 1 where said resilient treating material is essentially a polytetramethylene ether glycol prepolymer.

5. A sunglasses retainer comprising:
   A. two stretchable fabric tubes to fit snugly over temple pieces of said sunglasses and to constrict into and be frictionally held by hinges of said temple pieces,
   B. a resilient treating material in the interstices of the fibers on that portion of a first end of each of said two stretchable fabric tubes that will construct into said hinge,
   C. a manually adjustable friction catch holding means to slideably engage said two stretchable fabric tubes when said first end of each of said two stretchable fabric tubes is threaded through said manually adjustable friction catch holding means and over said temple pieces of said sunglasses,
   D. an enlarged portion on a second end of each of said two stretchable fabric tubes, with said enlarged portion being too large to slide through said manually adjustable friction catch holding means said manually adjustable friction catch holding means comprising a manually adjusable circular corrugated member, moveable in a housing that narrows at one end thereby frictionally holding said stretchable fabric tube increasingly tighter when said manually adjustable friction catch holding means is adjusted to a desired position and tension is applied to said stretchable fabric tubes extending from said one end of said housing.

6. Sunglasses retainer as in claim 5 where said stretchable fabric tube is a stretchable synthetic fiber.

7. A sunglasses retainer as in claim 5 where said resilient treating material is essentially a polytetramethylene ether glycol prepolymer.

8. A sunglasses retainer as in claim 5 where said enlarged portion on a said second end of each of said two stretchable fabric tubes is formed by knotting said second end of said two stretchable fabric tubes and treating said knotting with said resilient treating material.

9. A sunglasses retainer as in claim 5 where said enlarged portion on said second end of each of said two stretchable fabric tubes is of a plastic material.

* * * * *